United States Patent Office 3,799,796
Patented Mar. 26, 1974

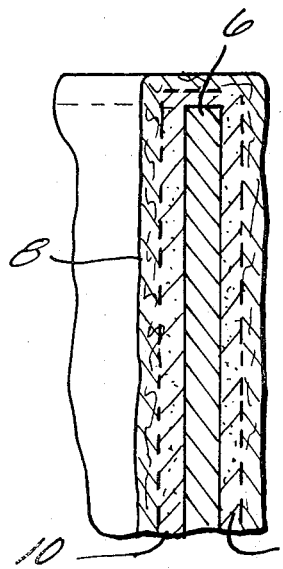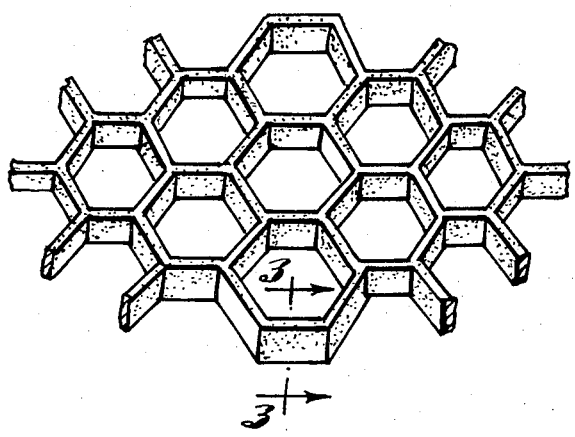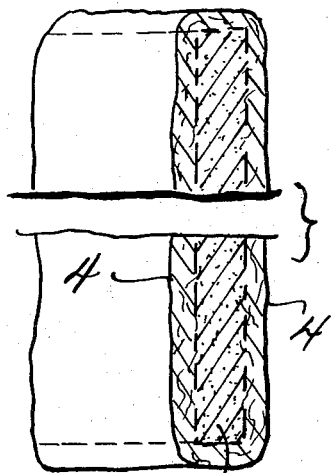

3,799,796
PREPARATION OF STRUCTURES WITH A COATING OF $Al_2O_3/SiO_2$ FIBERS BONDED TO $Al_2O_3$ FOR USE AS CATALYST SUBSTRATES
James B. Hunter, Newtown Square, Pa., assignor to Matthey Bishop, Inc., Malvern, Pa.
Filed Oct. 6, 1970, Ser. No. 78,523
Int. Cl. B01j 11/32
U.S. Cl. 117—70 A  4 Claims

ABSTRACT OF THE DISCLOSURE

A refractory composition suitable as a catalyst support comprising a porous coating of $Al_2O_3/SiO_2$ fibers surrounding and integrally bonded to an inner portion comprising $Al_2O_3$.

---

The present invention relates to a refractory composition which is uniquely useful as a catalyst support. The invention is also concerned with a process for making such composition and with catalysts made therefrom.

With the intensified interest in eliminating air pollution, considerable effort is being expended towards improving catalysts and supports therefor which might be useful in this area. An important requirement for such materials is that the catalyst structure be such as to permit high space velocity, i.e., the passage of substantial volumes of exhaust gas or fumes per unit of time, per cubic foot of catalyst, without substantial pressure drop or slowdown of the gas. Generally speaking, honeycomb ceramic structures are satisfactory in this respect but the processes by which such structures are made are complicated and time consuming. Consequently the presently available honeycomb ceramic supports and catalysts made therewith are too expensive for many important catalytic applications.

One of the honeycomb ceramics which is presently available as a support or substrate for catalysts is made by a process according to U.S. Pat. 3,255,027 (Talsma). In such process, aluminum honeycomb slabs (usually with dimensions in the order of 1′ x 1′ x ½″, 1″ or 1½″ and made up of appropriately shaped aluminum strips bonded together with epoxy or like binder) are dip coated in a slurry containing various amounts of aluminum powder, sodium silicate, silicon carbide, thickening agents and the like. After two or more dip coats, with intermediate drying, the coated slabs are carefully fired according to a detailed schedule which requires a total time of approximately four days and final temperatures as high as 2550° F. The finished product is a slab of honeycomb ceramic having a so-called "mullite" structure ($3Al_2O_3/2SiO_2$). The product is rigid and relatively smooth surfaced. Consequently, if the material is to be used as a catalyst support, it is generally coated with a high surface area alumina by a process referred to as "wash coating" so as to increase the surface area of the product. Wash coating is then followed by air drying, high temperature firing and application of catalytic metal or the equivalent.

Before applying the catalytic metal or the like, the "wash coated" support is cut, by suitable means, e.g. with a diamond hole cutter or carbide band saw (under water or dry) to yield a number of discs or the equivalent of appropriate size and shape. The scrap from this cutting operation is discarded while the discs or other cut shapes are processed as necessary to obtain the desired catalyst product. For example, if the discs are to be used as catalyst substrates, they may be dried overnight at 250° F., platinized at about 0.2–0.3% metal loading and shipped as produced to the customer.

It will be recognized that the above described process for making honeycomb ceramic catalyst supports and catalysts therefrom is time-consuming, complicated and expensive. Scrap resulting from cutting the wash coated product represents material which has itself been processed to a substantial extent and consequently constitutes an expensive item for discard. Firing to form the mullite structure requires the use of rigidly controlled time/temperature schedules involving relatively high temperatures and long times which necessarily add a great deal of cost to the product. Consequently, the product is too expensive to use for many catalytic applications. This is particularly true in cases where the following conditions exit:

(1) The space velocity is low (i.e. $<10{,}000$ hr.$^{-1}$)
(2) temperature requirements are not severe (T $\leq 1400°$ F.); and
(3) maximum physical strength is not required.

Such conditions apply, for example, in the case of catalysts for self-cleaning ovens and for auto and diesel engine exhaust control.

The principal object of the present invention is to provide a ceramic material suitable for use as a catalyst support, and a process of preparing same, which are free from the above mentioned prior art difficulties. More particularly, it is an object of the invention to provide a ceramic material which is a highly effective catalyst support, relatively inexpensive and, therefore, available for use in applications not hitherto considered practical or economically feasible. Preferably the product of the invention has a honeycomb structure although the invention is of broader application as discussed below.

Broadly stated, the objects of the invention are accomplished by the provision of a ceramic or refractory support material which comprises a porous outer layer or coating of $Al_2O_3/SiO_2$ fibers surrounding and integrally bonded to an inner portion which may be entirely or essentially $Al_2O_3$ or it may include a core of metal, e.g. mild steel, stainless steel, Inconel, aluminum alloy, or other material such as a composite of metal particles in a ceramic matrix.

From the process standpoint, the invention contemplates applying one or more ceramic cement coatings containing primarily $Al_2O_3/SiO_2$ fibers to an aluminum structure, e.g. a conventional aluminum honeycomb held together with an epoxy or like binder, drying to form a porous fibrous coating on the honeycomb or other structure and firing the coated product to melt the aluminum and convert it to alumina. To modify the structure for certain applications it may be desirable to also include in the ceramic cement some added high surface area $Al_2O_3$ powder and/or a metal powder having a melting point above that of the aluminum structure. The metal powder being wetted by the molten aluminum enhances the diffusion of the aluminum and at the same time alloys with it to form a strengthening metal inclusion. Despite the fact that the aluminum is melted, the fibrous ceramic holds the molten aluminum in place while permitting oxidation or alloying of the aluminum to occur so that the fired product retains the original shape of the starting structure. This product has outstanding properties for use as a catalyst support and because of the porous outer coating of ceramic fibers, it may not be necessary to wash coat before metallizing to provide an adequate catalyst surface. Thus, the fired structure can be directly metallized, using conventional metallizing techniques to form a catalyst although it will be appreciated that a wash coat may be applied before metallizing if this should be desired.

In one way of preparing a product according to the invention, a desired number of discs or other shapes, of required size, are punched or otherwise cut from conventional aluminum honeycomb slab, thereafter a continuous surface coating is applied to the cut shapes by dipping the latter into an aqueous slurry of a ceramic cement containing $Al_2O_3/SiO_2$ fibers, followed by air drying and then firing in at least two stages at temperatures and times sufficient to drive off the binder, e.g. epoxy, which is normally used to form an aluminum honeycomb and to melt the aluminum.

In a second way the aqeuous slurry of ceramic cement may contain and added amount of high surface area $Al_2O_3$ to give a substrate of greater catalytic surface area.

In a third variation the aqueous slurry may contain an added amount of metal powder to give a substrate of greater physical strength.

A fourth and preferred method involves a combination of the second and third ways described above. In this modification the aluminum structure is first dip coated in a slurry of ceramic cement containing a metal powder having a melting point above that of aluminum and capable of alloying with the aluminum. After air drying, the once coated structure is dip coated a second time with a dispersion of a high surface area $Al_2O_3$ in the ceramic cement. After air drying a second time the twice dipped substrate is fired at a temperature below the melting point of the aluminum to burn out the epoxy binder and then fired again at a temperature above the melting point of the aluminum to cause melting and alloying of the aluminum with the metal powder adjacent to its surface. All aluminum metal not alloyed in this way is subsequently converted to $Al_2O_3$ by the diffusion and reaction with oxygen in the furnace atmosphere.

The fibrous cement coating effectively envelopes the aluminum and retains the honeycomb structure even though the aluminum is melted, sufficient air passing through the fibrous coating to oxidize the aluminum while the latter though molten is prevented from escaping. It is difficult to determine the degree to which the aluminum is oxidized to alumina during firing. In any event, the molten aluminum is either converted to alumina or alloyed with the metal particles that may lie adjacent to the original metal structure. The fired product, after cooling, and with the same shape as the starting structure, is then ready to be impregnated with catalytic metal to complete the catalyst.

It will be recognized from the foregoing description that the present process provides a much easier way of making ceramic honeycomb structures or the equivalent for catalyst use than hitherto possible. Firing requires much lower temperatures and shorter times than considered essential with prior procedures. Additionally, as noted above, the present process makes it possible to eliminate the prior art wash coating step. Furthermore, the desired shapes are cut from the honeycomb slab as a first step rather than later on after wash coating as in the prior process so that substantially lower cost scrap can be discarded than is possible with the prior process.

The success of the invention is due, in large measure, to the use of a ceramic cement containing $Al_2O_3/SiO_2$ fibers. Other ceramic cements may be used but a particularly suitable ceramic cement is available as "Fiber-frax QF–180 Cement" (Carborundum). This cement comprises the reaction product of $Al_2O_3$ and $SiO_2$ blown into fibers and a small amount e.g. 10–50% by weight) of an air-setting, temperature resistant binder, e.g. colloidal silica. The diameters and lengths of the fibers may preferably be in the range of 1–10 microns.

The amount of fibrous cement employed will also vary dependent upon other operating factors, however, sufficient cement should be used to entirely cover the aluminum structure with the cement.

Preferably, to facilitate dip coating, the cement is made into an aqueous slurry by diluting with water. The amount of water so added can be varied as convenient provided the resulting slurry will give a continuous coating. Upon drying, the cement, because of the ceramic fiber content, gives the coated structure the necessary strength for handling and further processing. The honeycomb or equivalent structure may be coated a number of times with the fibrous ceramic cement provided a continuous coating is finally obtained. Dip coating is preferred but other means of application, e.g. spraying, may also be used.

Drying can be accomplished in any convenient fashion but preferably air drying is used.

Firing conditions can be widely varied although it is usually preferred to carry out the firing in at least two stages carried out continuously, one stage below the melting point of the aluminum, e.g. at a temperature in the range of about 900 to 1200° F. (usually for about 1–3 hours) followed by heating at a temperature above the melting point of aluminum, for instance, in the range of 1400° F. to 1600° F. for 1–3 hours. Times and temperatures outside these ranges can be used for the indicated two stage operations but whatever conditions are selected, it is important that these operations be carried out in continuous fashion. Additionally, it is important that the first stage of firing be sufficient to drive off the binder, which is used to make the honeycomb or equivalent starting structure. In the second firing stage, which should directly follow the first stage as noted above, the conditions used should be adequate to melt the aluminum and diffuse the same into the adjacent surface of the fibrous cement. Significantly, if the times and temperatures are not adequate to: (1) remove the epoxy or like binder associated with the honeycomb starting structure, and (2) to melt the remaining aluminum to complete the oxidation and/or alloying with an adjacent metal powder, the desired results are not attained. For example, conventional type epoxy binders will burn off at about 1000° F. but if the ceramic structure is heated only to 1000° F. and cooled, it is found that the structure has no strength and falls apart at the joints which had been glued together by the epoxy. Similarly, by firing at 1200° F., which is just below the melting point of the aluminum, the binder can be removed and surface of the metal will react with oxygen diffusing through the porous fibrous coating to form alumina but, unless a firing temperature above the melting point of aluminum is ultimately used so as to melt the aluminum, the structure obtained is unstable and splits along the cell edges of the honeycomb. Thus, it will be appreciated that the firing cycle must be such as to remove the conventional honeycomb binder, and cause surface conversion of the aluminum to alumina and/or to a higher melting aluminum alloy.

The invention is illustrated but not limited by the following examples:

EXAMPLE 1

An aluminum honeycomb slab (1' x 1' x ½", held together by epoxy binder, identified as ⅛" x ⅛" cell size/alloy 5052/aluminum gauge .002") was cut into a plurality of discs of about 1–1.5" diameter.

The discs were then surface coated by dipping the same in an aqueous slurry of Carborundum "Fiberfrax" QF–180 Cement diluted 4 volumes of cement with one volume of water. The discs were then vigorously shaken (or blown) to clear the honeycomb openings and air dried overnight. The process was repeated in order to cover the aluminum honeycomb structure with a continuous coating of the fibrous cement. After overnight air drying, the twice coated discs were dried in an oven at 250° F. for one hour followed immediately by firing at 1000° F. for one hour, then at 1200° F. for one hour and finally at 1400° F. for one hour. At the end of this time, the discs were removed from the oven and cooled at room temperature (70° F.). The discs were characterized by their strength and retained their original honeycomb structure, even though all of the aluminum had melted during the firing. Upon examination, the honeycomb products were observed as comprising a rough porous coating of $Al_2O_3/SiO_2$ in fibrous form intermixed at the center with a dispersed phase of $Al_2O_3$.

Because the surface of the discs was rough and porous, there was no need to wash coat before metallizing for catalytic use. Thus, the discs were platinized directly in conventional fashion (0.2–0.3% metal loading) and were then ready for use as catalysts, e.g. in treating engine exhaust fumes. Alternatively, a plurality of the discs could be assembled to give a "catalyst plug" by mounting one or more discs in a short length of Fiberfrax paper tube or like ceramic or metal container.

EXAMPLE 2

Example 1 was repeated except that, in the second dip coating, a high surface area gamma alumina was included in the diluted cement. Essentilly similar results were obtained.

EXAMPLE 3

The process was repeated except that eta alumina was included in the fibrous cement with equivalent results.

EXAMPLE 4

Examples 2 and 3 were repeated again except that in this case an amount of finely divided titanium powder was included in the diluted cement used for the first dip. The presence of this dispersed metal serves to not only strengthen the "Fiberfrax" coating but results in the conversion of the original aluminum honeycomb structure to a higher melting titanium aluminum alloy which provides additional strengthening of the entire substrate. Any portion of the original aluminum structure that is not converted to a high melting aluminum alloy is oxidized to $Al_2O_3$ during firing above 1200° F. so that the original aluminum structure is completely eliminated.

While the invention is of particular importance in the fabrication of honeycomb catalyst structures as exemplified above, it will be appreciated that other types of structures, including those which are not necessarily intended for use as catalysts or supports therefor, can also be made in the manner described herein. Similarly the starting structure, whether or not a honeycomb, need not consist entirely or essentially of aluminum. For example, the starting structure may be a honeycomb or other shape comprising a laminate or composite made up of a center sheet or core of steel (or other metal having a melting point above that of aluminum) covered by outer layers of aluminum sheet (e.g. .002" gauge). Flat and corrugated strips of this composite may be rolled up to form, in essence, a honeycomb structure which is then dip coated with $Al_2O_3/SiO_2$ fibrous ceramic cement and then fired in the manner described above to give a modified "honeycomb" product comprising a porous coating of $Al_2O_3/SiO_2$ fibers surrounding a dispersed phase of $Al_2O_3$ and an inner core of steel or other metal. This embodiment of the invention is illustrated by the following example:

EXAMPLE 5

A flat composite strip comprising two outer layers of aluminum bonded to an inner steel core and a corrugated strip of the same composite material were rolled up to form a spirally wound "honeycomb" structure. This was dip coated and otherwise processed as described in Example 1. After firing and cooling, a product was obtained comprising a honeycomb structure made up of an outer porous coating of fibrous $Al_2O_3/SiO_2$ enveloping the steel strip and bonded thereto, directly and/or through an intermediate $Al_2O_3$ layer, the inner surface of the $Al_2O_3/SiO_2$ coating, i.e. the surface directly adjacent the steel, having intermixed therein a dispersed phase of $Al_2O_3$. This product, when platinized, was a highly effective catalyst.

The invention is further illustrated by the attached drawings wherein:

FIG. 1 diagrammatically shows the present process.

FIG. 2 is a perspective view of a honeycomb structure according to the invention, while FIG. 3 is a vertical sectional view on the line 3—3 of FIG. 2.

FIG. 4 is a sectional view showing an alternative product according to the invention.

Referring more particularly to FIG. 1, it will be noted that the process as illustrated shows cutting (or punching) the appropriately sized shapes from the aluminum honeycomb sheet, followed by dip coating, drying, firing and platinizing or metallizing as desired. In FIG. 2, the honeycomb product is disclosed, the product comprising (as shown in FIG. 3) a central portion 2 which is composed of $Al_2O_3$, integrally bonded and dispersed into the porous coating 4 of $Al_2O_3/SiO_2$ fibers. It will be understood that the thicknesses of the $Al_2O_3$ portion 2 and coating 4 are greatly exaggerated for the purpose of illustration. In the embodiment of FIG. 4, the composite comprises a metal core 6 with outer coating 8 of $Al_2O_3/SiO_2$ fibers and the $Al_2O_3$ phase 10 intermixed with the inner face of the coating 8. The product of FIG. 4 can be prepared in the manner shown in Examples 4 and 5.

It will be appreciated that the invention may be used with either aluminum or aluminum base alloys, e.g. alloys containing small amounts of any one or more of the following: zinc (1-4%), magnesium (0.5-4%), copper (up to 0.30%), manganese (up to 0.5%), chromium (up to 0.5%), iron (up to 0.5%), silicon (up to 0.5%), titanium (up to 0.5%), other up to .05%, totaling up to 0.5% balance aluminum.

Various other modifications in the invention as described above will be apparent to those in the art. Hence, the scope of the invention is defined in the following claims wherein:

I claim:

1. A method of preparing a composition suitable as a catalyst support comprising a porous coating of $Al_2O_3/SiO_2$ fibers surrounding and integrally bonded to an inner portion comprising $Al_2O_3$, which comprises providing an aluminum metal base structure of desired size and shape, coating said structure with a ceramic cement containing $Al_2O_3/SiO_2$ fibers and colloidal silica so that the aluminum is encased in said cement and then drying and firing the coated product to melt said aluminum and convert same to $Al_2O_3$ in a shape and size corresponding with that of said aluminum metal base structure, the $Al_2O_3$ formed by melting said aluminum being intermixed with the portion of said ceramic coating directly adjacent thereto so as to form a dispersed phase of $Al_2O_3$ therein, the firing being carried out at a temperature not in excess of about 1600° F. and for a time not in excess of about 6 hours.

2. The method of claim 1 wherein said structure is an aluminum honeycomb.

3. The method of claim 1 wherein the aluminum base structure comprises an outer layer of aluminum bonded to an inner core of a metal having a melting point above that of aluminum.

4. The method of claim 1 wherein the ceramic cement also contains powder of a metal having a melting point higher than and capable of alloying with alumium.

References Cited

UNITED STATES PATENTS

| | | | |
|---|---|---|---|
| 3,397,154 | 8/1968 | Talsma | 252—463 |
| 3,554,929 | 1/1971 | Aarons | 252—477 R |
| 3,441,382 | 4/1969 | Keith et al. | 23—288 F |
| 3,383,159 | 5/1968 | Smith Jr. | 106—65 |
| 3,565,830 | 2/1971 | Keith et al. | 252—477 R |
| 3,255,027 | 6/1966 | Talsma | 252—466 |
| 3,473,987 | 10/1969 | Sowards | 156—89 |
| 3,191,659 | 6/1965 | Weiss | 431—328 |
| 3,179,156 | 4/1965 | Weiss et al. | 106—65 |

DANIEL E. WYMAN, Primary Examiner

P. E. KONOPKA, Assistant Examiner

U.S. Cl. X.R.

23—288 F; 106—65, 69, 73.4; 117—135.1; 252—455 R, 477 R